(No Model.) 2 Sheets—Sheet 1.
H. NICHOLSBURG.
APPARATUS FOR WASHING CARRIAGES OR OTHER VEHICLES.
No. 601,003. Patented Mar. 22, 1898.
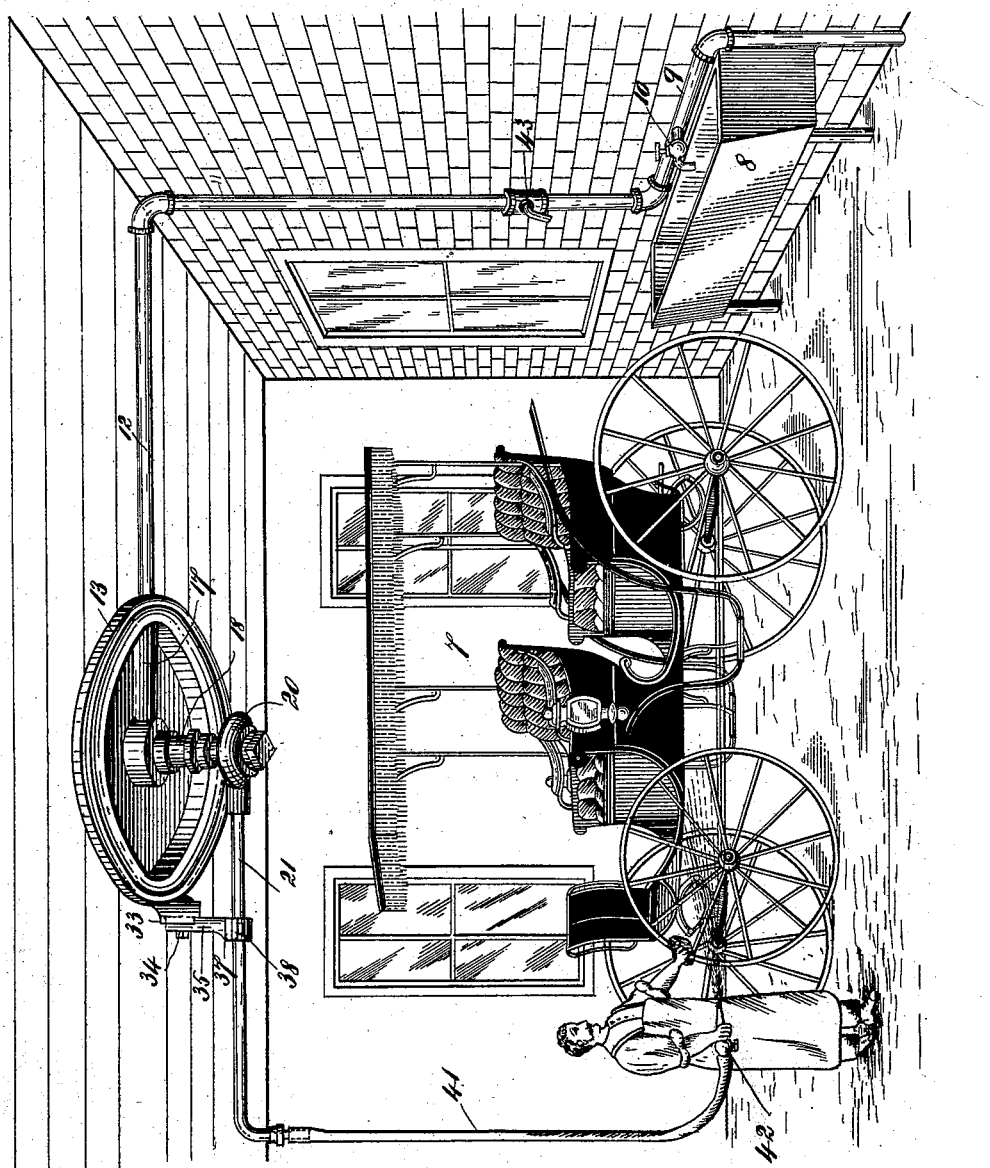
WITNESSES:
John Buckler,
C Gerst
INVENTOR
Henry Nicholsburg
BY
Edgar Tate
ATTORNEYS.

(No Model.) 2 Sheets—Sheet 2.
H. NICHOLSBURG.
APPARATUS FOR WASHING CARRIAGES OR OTHER VEHICLES.
No. 601,003. Patented Mar. 22, 1898.
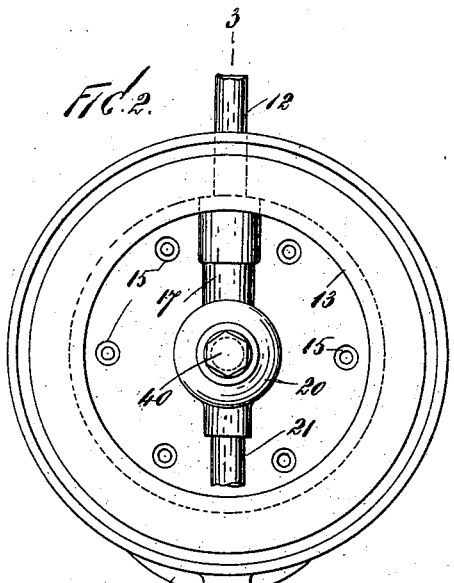
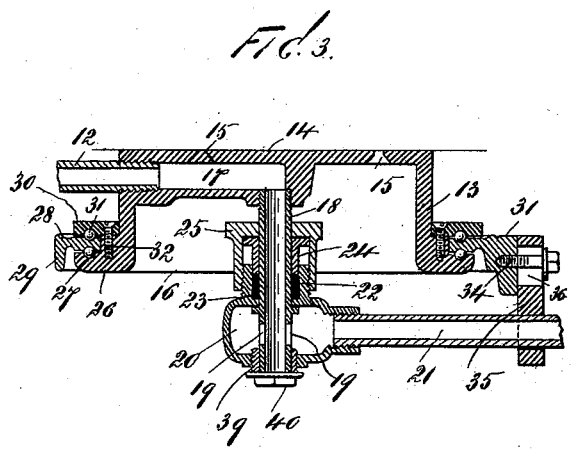
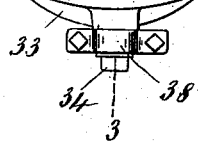
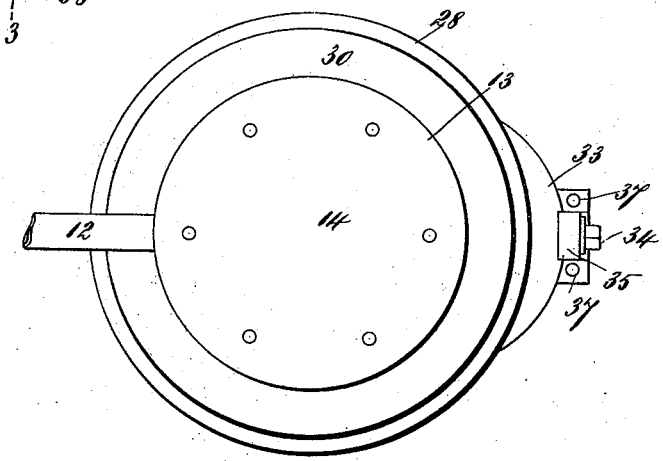
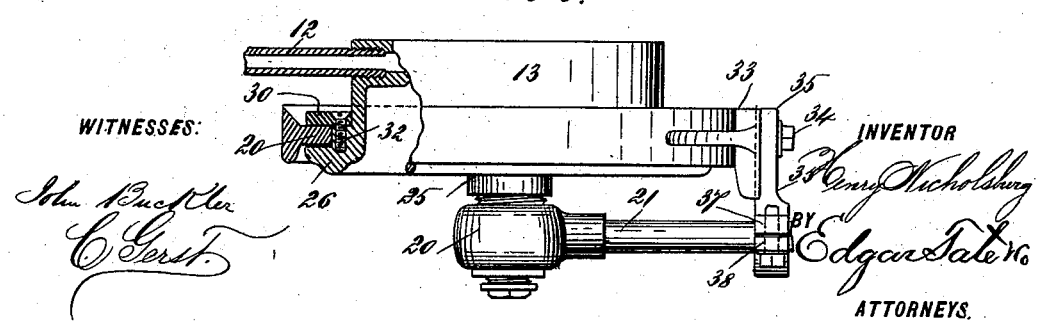
WITNESSES:
John Buckler
C. Gerst
INVENTOR
Henry Nicholsburg
BY
Edgar Tate &co.
ATTORNEYS.

UNITED STATES PATENT OFFICE.

HENRY NICHOLSBURG, OF NEW YORK, N. Y., ASSIGNOR TO THE H. NICHOLSBURG MANUFACTURING COMPANY, OF SAME PLACE.

APPARATUS FOR WASHING CARRIAGES OR OTHER VEHICLES.

SPECIFICATION forming part of Letters Patent No. 601,003, dated March 22, 1898.

Application filed June 23, 1897. Serial No. 641,919. (No model.)

*To all whom it may concern:*

Be it known that I, HENRY NICHOLSBURG, a citizen of the United States, residing at New York, in the county of New York and State of New York, have invented certain new and useful Improvements in Apparatus for Washing Carriages or other Vehicles, of which the following is a full and complete specification, such as will enable those skilled in the art to which it appertains to make and use the same.

This invention relates to apparatus for washing carriages, buggies, and other vehicles; and the object thereof is to provide an improved apparatus for this purpose which is simple in construction and operation and which is adapted for use in a carriage-house or similar place.

The invention is fully disclosed in the following specification, of which the accompanying drawings form a part, in which—

Figure 1 is an interior perspective view of a carriage-house, showing a carriage therein and also showing in perspective my improved apparatus and the method of operating the same; Fig. 2, a bottom plan view of that part of my improved apparatus which is connected with the ceiling of the carriage-house; Fig. 3, a cross-section thereof on the line 3 3; Fig. 4, a top plan view of the device shown in Fig. 2, and Fig. 5 a sectional side view of a modified form thereof.

In the drawings forming part of this specification the separate parts of my improvement are designated by the same numerals of reference in each of the views, and in said drawings, reference being made to Fig. 1, I have shown the interior of a carriage-house in which is placed a carriage 7, and at one end or adjacent to one wall is placed a trough 8, above which is placed a water-pipe 9, which is provided with a faucet 10, which is adapted to discharge the water into the trough 8, and said water-pipe is carried upwardly to the ceiling, as shown at 11, and which is provided with a branch 12, which extends to about centrally of the ceiling. I also provide a cylindrical casing 13, which is provided with a closed top 14, in which are formed holes or openings 15, whereby said casing is adapted to be secured to the ceiling, and the cylindrical casing 13 is open at its inner side, as shown at 16, and the branch 12 of the water-pipe passes through the upper portion of the said casing at one side thereof, and formed in said casing is a tubular chamber 17, with which said branch pipe 12 communicates, and communicating centrally with said tubular chamber is a depending tube 18, which is provided near the lower end thereof with ports or passages 19, and mounted on the lower end of the tube 18 is a casing 20, which incloses the ports or passages 19 and which is provided at one side with a tube 21, and the casing 20 is provided on the upper side thereof with a screw-threaded tubular extension 22, through which the tube 18 passes and in which is placed a packing-ring 23, which is held in place by a tubular sleeve 24, and mounted on the tubular sleeve 24 and around the tube 18 is a cap 25, the lower end of which is connected with the tubular extension 22 of the casing 21 by means of a screw-thread, this construction being adapted to serve as a stuffing-box, as will be readily understood.

The casing 20 is adapted to turn on the tube 18, and the cylindrical casing 13 is provided at the lower edge with an outwardly-directed flange 26, in which is formed a groove 27, in which are placed ball-bearings, and mounted on said flange is a flat ring 28, which is provided with a downwardly-directed annular rim 29, and said ring 28 is provided at its under side with a groove which corresponds with the groove 27 and on the upper side thereof with a corresponding groove, and above said ring is placed an annular bearing 30, and between said bearing 30 and the ring 28 are placed ball-bearings, as shown at 31, and the said bearing-ring 30 is secured to the annular flange 26 by screws or bolts 32.

The ring 28 is free to turn between the bearing 30 and the flange 26, and the ball-bearings between said parts reduce the friction to a minimum, and said rim 29 is provided at one side with an outwardly-directed shoulder 33, which is circular or convex in form, and connected therewith by means of a screw or bolt 34 is a hanger 35, provided with a slot 36, through which said screw or bolt passes, and the lower end of said hanger is provided with a cross-head 37, which is bolted to another cross-head 38, and these cross-heads serve as bearings to support the pipe 21, which is connected with the casing 20, which is mounted on the shaft 18. This construction is best shown in Figs. 2, 3, and 4, and the casing 20 is held on the tube 18 by a screw-threaded sleeve 39, which is provided with a cap or head 40, and in the operation of the apparatus the casing 20, the pipe 21, connected therewith, and the ring 28 are all free to turn in either direction on the flange 26 of the casing 13.

In Fig. 5 I have shown a modification in which the ring 28 is somewhat different in form from that shown in Fig. 3 and the ball-bearings are omitted, the construction being otherwise the same, as hereinbefore described.

Connected with the outer end of the pipe 21 is a flexible tube 41, which is provided with a discharge-nozzle 42, and the operation will be readily understood from the foregoing description when taken in connection with the accompanying drawings and the following statement thereof.

The pipe 21 and the casing 20, together with the ring 28 and the hanger 35, may all be turned by means of the flexible tube 41, and in practice all that is necessary is to turn on the valve 43 and the water will flow through the water-pipe and through the branch pipe 18 into the casing 20 and out through the nozzle 42, and said nozzle may be manipulated as usual with this class of devices, the operation of the apparatus being shown in Fig. 1.

My improvement is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. In an apparatus for the purpose herein described a circular casing which is adapted to be secured to a ceiling or other support, said casing being provided at the lower edge thereof, with an annular outwardly-directed flange, a revoluble ring mounted on said flange, a pipe suspended about the center of said casing, a water-pipe which passes into said casing and is in communication with said suspended pipe, a casing mounted on the lower end of said suspended pipe and in communication therewith, and adapted to turn thereon, and a pipe connected with said casing and with a hanger suspended from said revoluble ring, substantially as shown and described.

2. In an apparatus for the purpose herein described a circular casing which is adapted to be secured to a ceiling or other support, said casing being provided at the lower edge thereof, with an annular outwardly-directed flange, a revoluble ring mounted on said flange, a pipe suspended from the center of said casing, a water-pipe which passes into said casing and is in communication with said suspended pipe, a casing mounted on the lower end of said suspended pipe and in communication therewith, and adapted to turn thereon, a pipe connected with said casing, and with a hanger suspended from said revoluble ring, said revoluble ring being held in position by a bearing-ring which is placed thereon, and ball-bearings placed between said revoluble ring and said bearing, and the flange on which said revoluble ring is placed, substantially as shown and described.

3. In an apparatus for the purpose herein described a cylindrical casing as 13, which is adapted to be secured to a ceiling or other support, said casing being provided at its lower edge with an outwardly-directed annular flange, a pipe suspended from the center of said casing, a water-pipe which passes into said casing and which is in communication with said suspended pipe, a revoluble ring mounted on said annular flange, a casing mounted on the lower end of said suspended pipe and in communication therewith, a pipe in communication with said last-named casing, and passing through a support connected with said revoluble ring, and a flexible tube which is adapted to be connected with said last-named pipe, substantially as shown and described.

In testimony that I claim the foregoing as my invention I have signed my name, in presence of the subscribing witnesses, this 19th day of June, 1897.

HENRY NICHOLSBURG.

Witnesses:
C. GERST,
A. C. VAN BLARCOM.